(12) United States Patent
Yang et al.

(10) Patent No.: US 9,738,298 B1
(45) Date of Patent: Aug. 22, 2017

(54) COLLAPSIBLE WAGON COMPRISING A TAILGATE

(71) Applicant: Zhejiang Hengfeng Top Leisure Co., Ltd., Hangzhou, Zhejiang (CN)

(72) Inventors: Baoqing Yang, HangZhou (CN); Ron Markle, Indianapolis, IN (US)

(73) Assignee: ZHEJIANG HENGFENG TOP LEISURE CO., LTD., Hangzhou (CN)

( * ) Notice: Subject to any disclaimer, the term of this patent is extended or adjusted under 35 U.S.C. 154(b) by 0 days.

(21) Appl. No.: 15/226,653

(22) Filed: Aug. 2, 2016

(51) Int. Cl.
*B62B 1/00* (2006.01)
*B62B 3/02* (2006.01)
*B62B 5/00* (2006.01)

(52) U.S. Cl.
CPC ............ *B62B 3/025* (2013.01); *B62B 5/0003* (2013.01)

(58) Field of Classification Search
CPC ...... B62B 3/025; B62B 3/007; B62B 2205/06
See application file for complete search history.

(56) References Cited

U.S. PATENT DOCUMENTS

| | | |
|---|---|---|
| 1,771,836 A | 7/1930 | Beckham |
| 1,919,103 A | 7/1933 | Dolge |
| 1,998,269 A | 4/1935 | Brown |
| 2,016,232 A | 10/1935 | Floyd |
| 2,020,766 A | 11/1935 | Brown |
| 2,036,455 A | 4/1936 | Brown |
| 2,049,683 A | 8/1936 | Baumgardner |
| 2,421,751 A | 6/1947 | Giordano |
| D177,208 S | 3/1956 | Berlin |
| 3,945,660 A | 3/1976 | Zalewski |
| 4,055,357 A | 10/1977 | Sorocin |
| 4,735,426 A | 4/1988 | McConnell |
| 5,222,748 A | 6/1993 | Johnson |
| 5,649,718 A | 7/1997 | Groglio |
| 5,915,723 A | 6/1999 | Austin |
| 6,179,374 B1 | 1/2001 | Tang |
| 6,260,566 B1 | 7/2001 | LaFave et al. |
| 6,276,548 B1 | 8/2001 | Mitchell |
| 6,354,619 B1 | 3/2002 | Kim |
| 6,378,893 B1 * | 4/2002 | Jager .................. B62D 33/0207 280/401 |
| 6,438,773 B1 | 8/2002 | Hsia |
| 6,491,318 B1 | 12/2002 | Galt et al. |
| 6,845,991 B1 | 1/2005 | Ritucci et al. |
| 6,929,230 B2 | 8/2005 | Tsai |
| 7,097,182 B1 | 8/2006 | Liu |
| 7,131,364 B2 | 11/2006 | Brazell |
| 7,163,228 B2 | 1/2007 | Faber |
| D551,723 S | 9/2007 | Schlegel et al. |
| D551,724 S | 9/2007 | Seckel et al. |
| 7,281,731 B2 | 10/2007 | Shamah |
| 7,503,085 B2 | 3/2009 | Harrison et al. |
| 7,547,037 B2 | 6/2009 | Poppinga et al. |
| 7,625,033 B2 | 12/2009 | Michelau et al. |
| 7,731,221 B2 | 6/2010 | Bess |
| 7,770,913 B2 | 8/2010 | Cannon |

(Continued)

*Primary Examiner* — Brian Swenson
(74) *Attorney, Agent, or Firm* — Thompson Coburn LLP

(57) ABSTRACT

A collapsible wagon is adjustable between an expanded configuration and a collapsed configuration. The wagon comprises a frame, four wheels, and a pliable liner. The frame has a front wall, two side walls, and a rear tailgate. The walls and tailgate of the wagon are collapsible for storing the wagon.

9 Claims, 7 Drawing Sheets

(56) References Cited

U.S. PATENT DOCUMENTS

| | | |
|---|---|---|
| 8,011,686 B2 | 9/2011 | Chen et al. |
| 8,024,825 B2 | 9/2011 | Harrison et al. |
| 8,162,349 B1 | 4/2012 | Roselle |
| 8,220,824 B2 | 7/2012 | Chen et al. |
| 8,388,015 B2 | 3/2013 | Chen |
| 8,882,136 B2 | 11/2014 | Glaser et al. |
| 9,073,564 B2 | 7/2015 | Yang et al. |
| 9,082,311 B2 | 7/2015 | Franzblau |
| 9,108,656 B1 | 8/2015 | Nolan et al. |
| 9,145,154 B1 * | 9/2015 | Horowitz ................ B62B 3/025 |
| 2003/0025301 A1 | 2/2003 | Banuelos |
| 2007/0284900 A1 | 12/2007 | Sze |
| 2008/0217886 A1 | 9/2008 | Poppinga et al. |
| 2010/0090444 A1 | 4/2010 | Chen et al. |
| 2010/0156069 A1 | 6/2010 | Chen |
| 2011/0204598 A1 * | 8/2011 | Stevenson ................ B62B 3/02 |
| | | 280/639 |
| 2015/0035258 A1 * | 2/2015 | Chen ........................ B62B 3/02 |
| | | 280/651 |
| 2016/0347338 A1 * | 12/2016 | Vargas, II ................ B62B 3/02 |

* cited by examiner

US 9,738,298 B1

COLLAPSIBLE WAGON COMPRISING A TAILGATE

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to hand-drawn wagons. More particularly, the present invention pertains to a hand-drawn wagon that is collapsible in a manner such that the wagon can be stored in a minimal amount of space. Even more particularly, the present invention pertains to such a collapsible wagon that has a tailgate that can be oriented substantially vertical or substantially horizontal when the wagon is in use.

General Background

Hand-drawn wagons typically have an open-top cuboid compartment for holding and transporting things, including children. Such wagons also typically comprise four wheels for supporting the wagons from surfaces. Typically, two of the wheels of such a wagon are able to pivot with respect to the remaining wheels in a manner allowing the wagon to be steered. Such a wagon also typically comprises a tow handle that is configured to be pulled by an individual to move and steer the wagon.

In addition to the foregoing, some wagons are configured to be collapsible. For example, U.S. Pat. No. 9,073,564, issued Jul. 7, 2015, which is hereby incorporated by reference herein in its entirety, discloses such a collapsible wagon. A collapsible wagon typically has a collapsible frame and a pliable liner that forms the compartment of the wagon. When such a wagon is collapsed, the pliable liner folds in on itself as the frame collapses.

SUMMARY OF THE INVENTION

The present invention pertains to a collapsible wagon that comprises a tailgate that can be oriented alternatively in closed and open orientations.

In one aspect of the invention, a wagon is adjustable between an expanded configuration and a collapsed configuration. The wagon comprises a frame, four wheels, and a pliable liner. The frame has a front wall, two side walls, and a rear tailgate. Each of the front wall, side walls, and the tailgate is formed by a respective scissor-bar assembly. The frame also has a vertically oriented telescoping pole assembly at each intersection where the scissor-bar assembly of the front wall meets each of the side walls. The frame further has a vertical telescoping pole assembly connected to each rear end of the scissor-bar assemblies of the side walls and a telescoping poll assembly at each side end of the scissor bar assembly of the tailgate. The tailgate and the telescoping polls attached thereto are pivotal from a substantially vertical orientation to a substantially horizontal orientation when the wagon is in the expanded configuration. The frame is such that as the wagon is altered from the wagon's expanded configuration to the wagon's collapsed configuration with the tailgate in its vertical orientation the scissor-bar assemblies and the telescoping pole assemblies increase in height and the scissor-bar assemblies decrease in width. Each wheel is attached to a bottom end portion of a respective one of the telescoping pole assemblies. The pliable liner is connected to the frame and defines an open-top interior compartment of the wagon when the wagon is in the wagon's expanded configuration.

Further features and advantages of the present invention, as well as the operation of the invention, are described in detail below with reference to the accompanying drawings.

Figure 1:
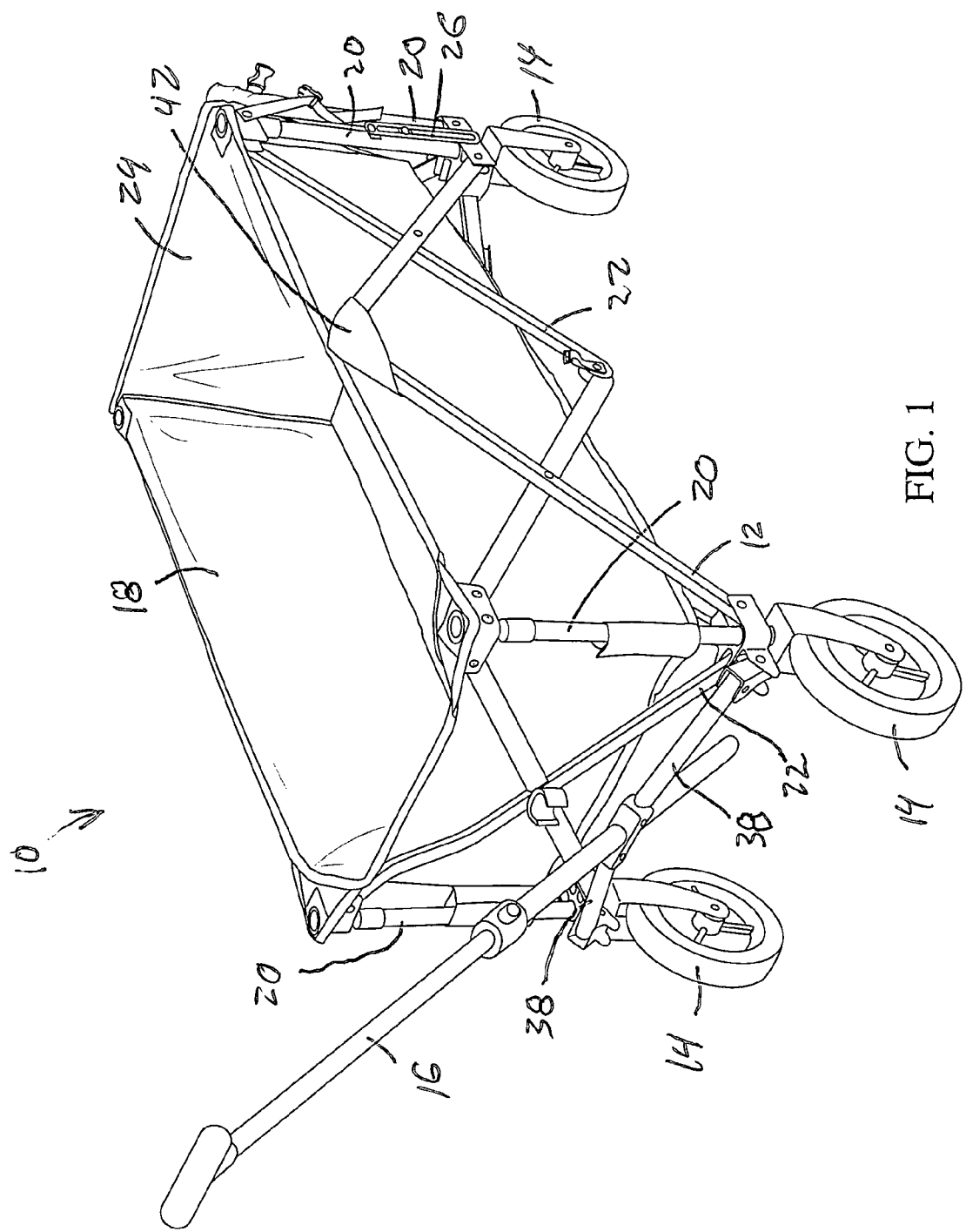
FIG. 1 depicts a perspective view of a wagon in accordance with the invention in its expanded configuration with the tailgate closed.

Reference numerals in the written specification and in the drawing figures indicate corresponding items.

DETAILED DESCRIPTION

Figure 2:
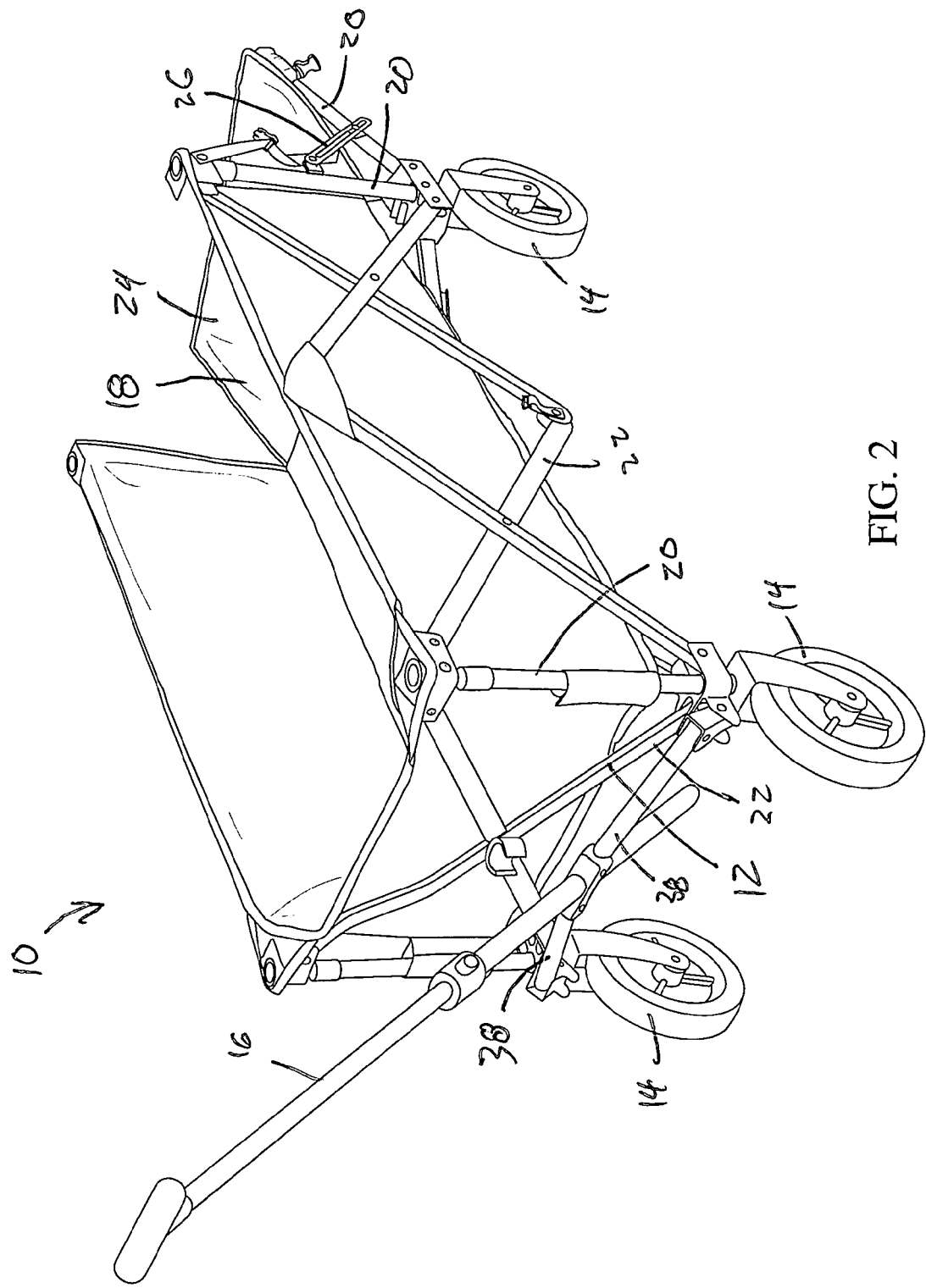
FIG. 2 depicts a perspective view of the wagon shown in FIG. 1 in its expanded configuration with the tailgate partially opened.
Figure 3:
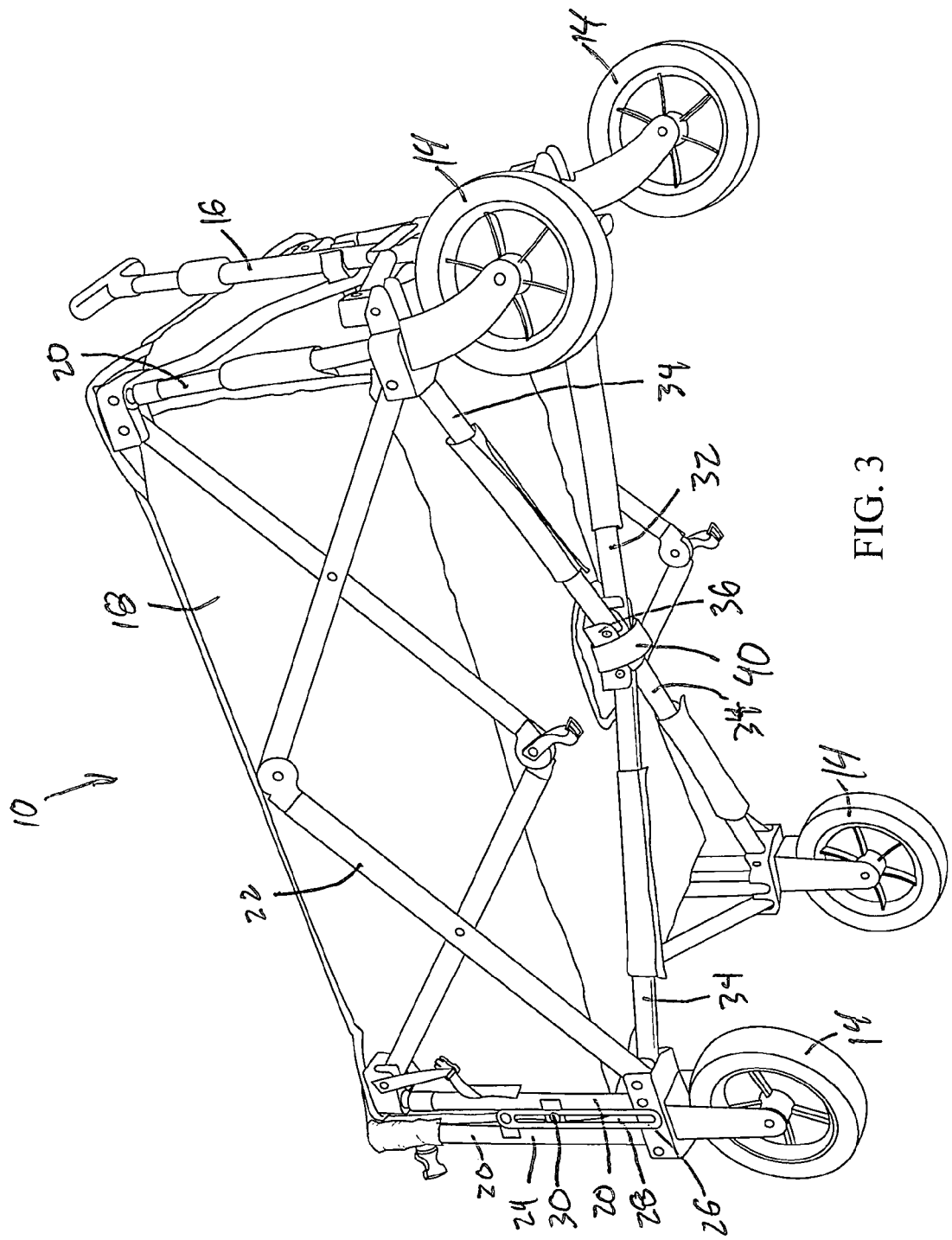
FIG. 3 depicts a perspective view of the wagon showing the bottom side of the wagon in its expanded configuration.
Figure 4:
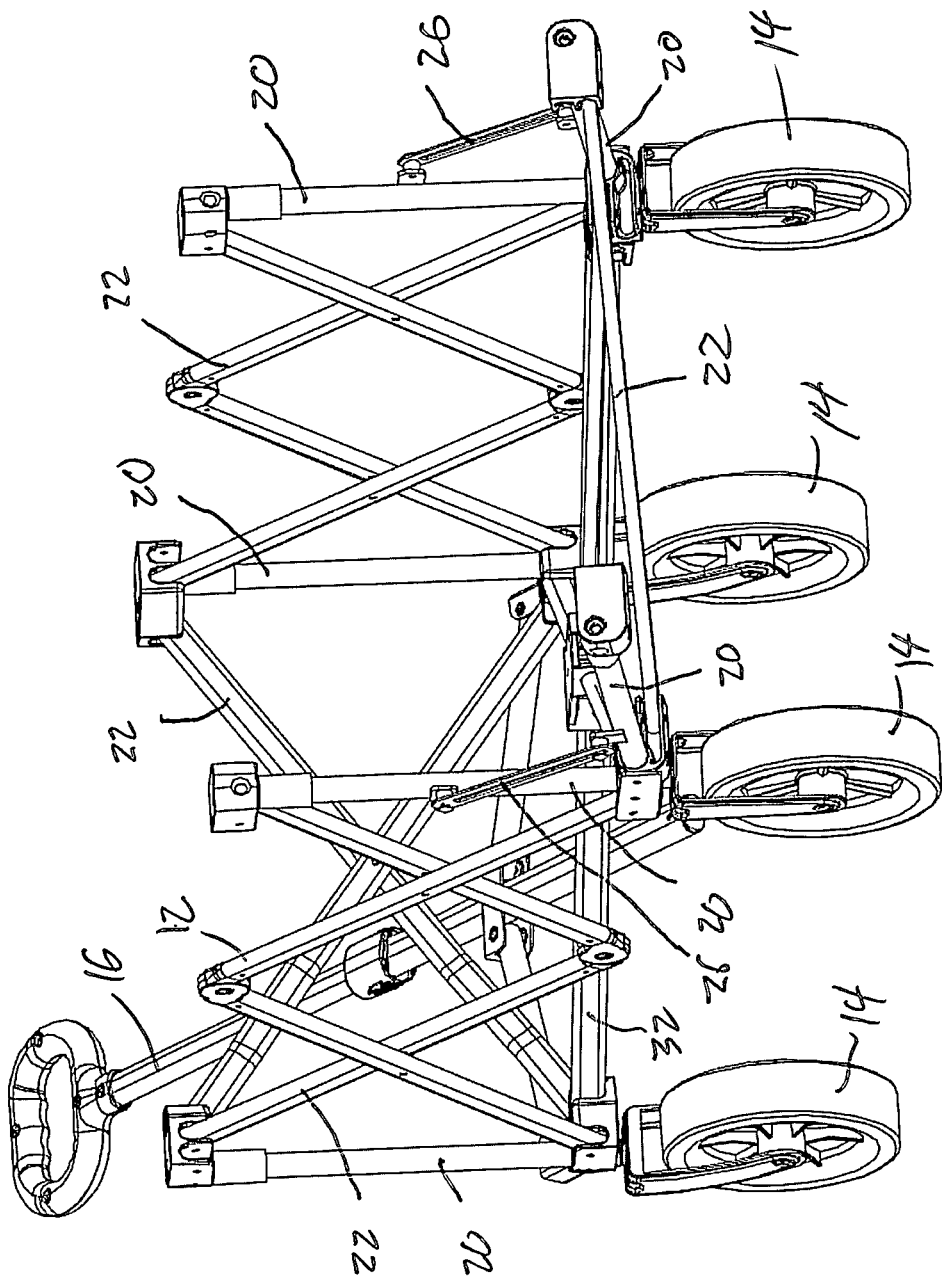
FIG. 4 depicts a perspective view of the wagon from the rear, with the pliable liner omitted, and with the frame in its expanded configuration with the tailgate in its open orientation.

A preferred embodiment of a collapsible wagon 10 in accordance with the present invention is shown in its entirety in FIGS. 1-3. The collapsible wagon 10 comprises a frame 12, a plurality of wheels 14, a tow handle 16, and a pliable liner 18.

Figure 5:
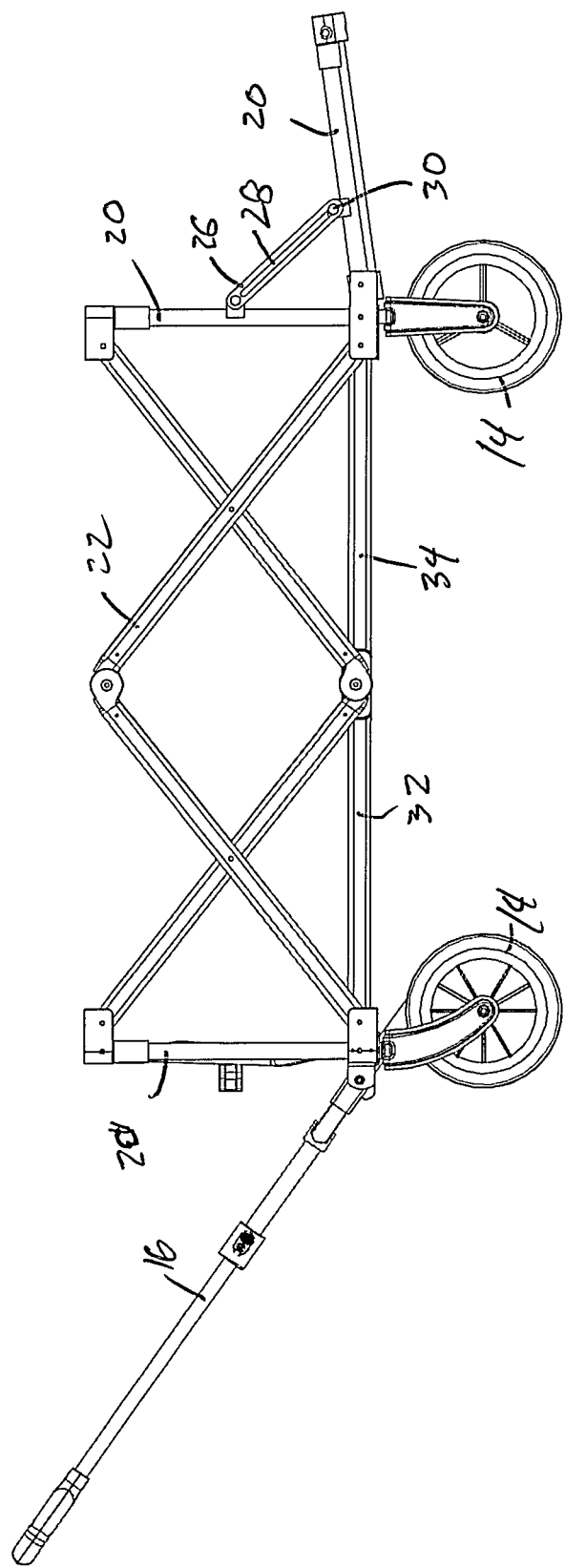
FIG. 5 depicts a side view of the wagon, with the pliable liner omitted, and with the frame in its expanded configuration with the tailgate in its open orientation.
Figure 6:
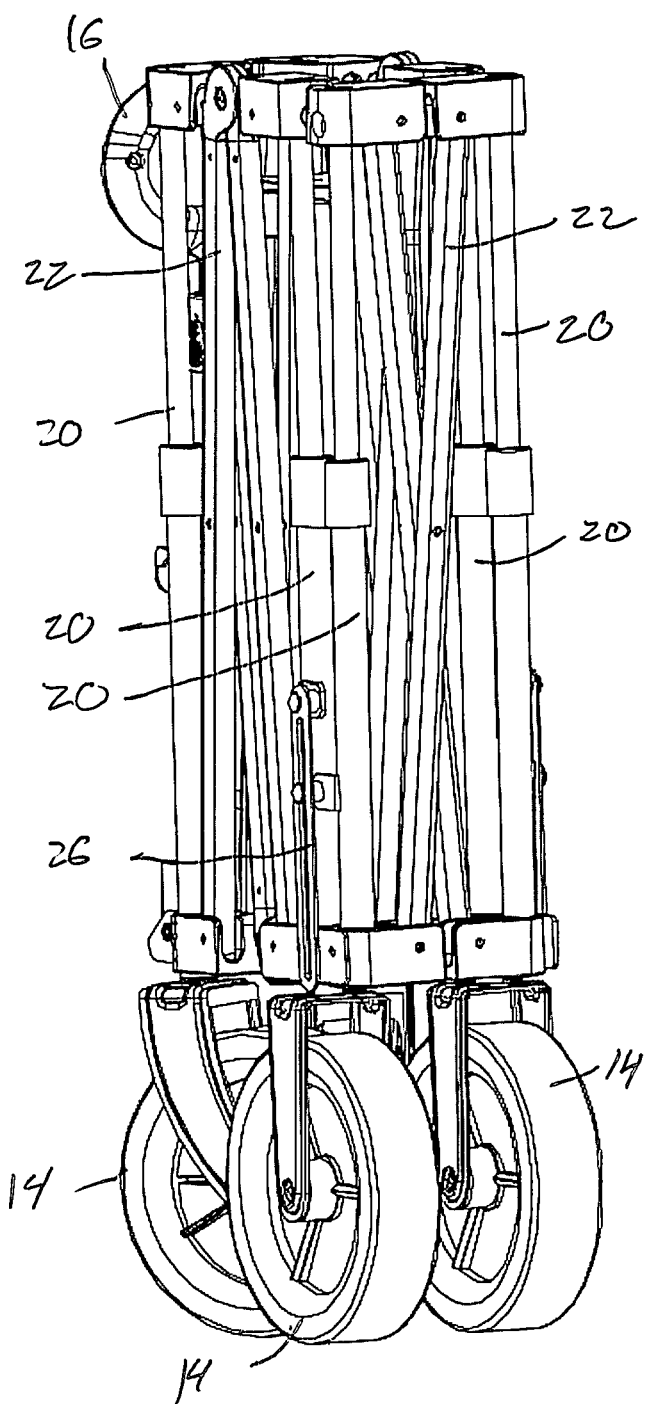
FIG. 6 depicts a perspective view of the wagon, with the pliable liner omitted, and in its collapsed state.
Figure 7:
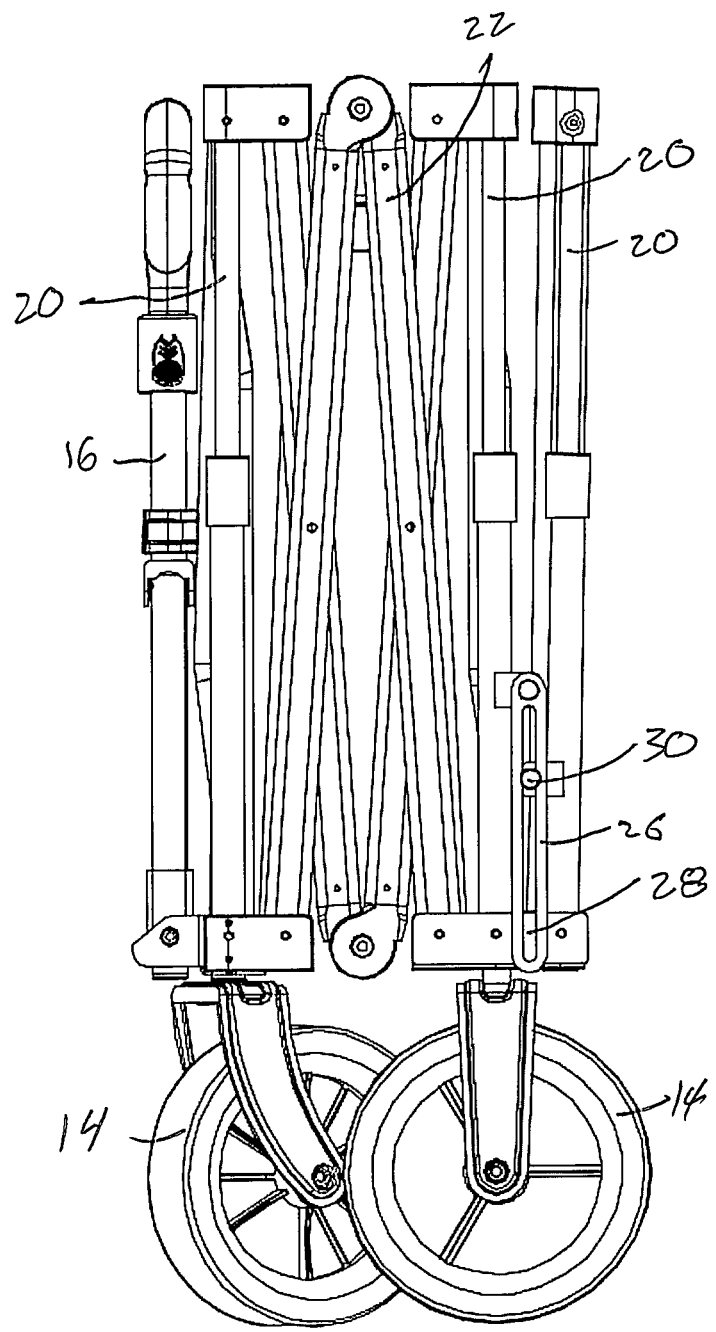
FIG. 7 depicts a side view of the wagon, with the pliable liner omitted, and in its collapsed state.

The frame 12 of the wagon 10 includes six telescoping pole assemblies 20 and four scissor-bar assemblies 22. Each of the four telescoping pole assemblies 20 preferably includes an upper tube member that is slideably received in a lower tube member in a manner such that the upper tube member can partially retract into the lower tube member. Thus, each telescoping pole assembly 20 can be adjusted between an expanded configuration and a collapsed configuration. Each scissor-bar assembly 22 comprises at least one pair of crossed bars that are pivotally joined to each other. Preferably, two of the scissor-bar assemblies 22 each comprise a single pair of crossed bars, while the other two scissor-bar assemblies each comprise two attached pairs of the crossed bars. Each scissor-bar assembly 22 has left and right upper corner portions and left and right lower corner portions. As is typical with most scissor-bar assemblies in general, each scissor-bar assembly 22 is adjustable between an expanded configuration and a collapsed configuration. The upper corner portions of each of the scissor-bar assemblies 22 are closer to the corresponding lower corner portions thereof when the said scissor-bar assembly is in the expanded configuration (as shown in FIGS. 1-5) as compared to the collapsed configuration (as shown in FIGS. 6 and 7). Similarly, the upper corner portions of each of the scissor-bar assemblies 22 are closer to each other when said scissor-bar assembly is in the collapsed configuration as compared to the expanded configuration. The top end portion of each of the two forward most telescoping pole assemblies 20 is pivotally connected to the left upper corner portion of a one of the scissor-bar assemblies 22 and to the right upper corner portion of another one of the scissor-bar assemblies. Similarly, the lower end portion of each of the two forward most telescoping pole assemblies 20 is pivotally connected to the left lower corner portion of the corresponding scissor-bar assembly 22 and to the right lower corner portion of the other corresponding scissor-bar assembly. Two of the telescoping pole assemblies 20 are connected to the rear ends of the scissor-bar assembly 22 of each of the side walls of the wagon 10. The remaining two telescoping pole assemblies 20 are attached to the opposite sides of the rear wall of the wagon 10, which collectively form a tailgate 24 as described in more detail below. As such, the telescoping pole assemblies 20 adjust from their expanded configuration to their collapsed configuration as the scissor-bar assemblies 22 adjust from their collapsed configuration to their expanded configuration and each of the telescoping pole assemblies moves toward each of the other telescoping pole assemblies as the scissor-bar assemblies adjust from their expanded configuration to their collapsed configuration. Thus, as the wagon 10 collapses, the telescoping pole assemblies 20 expand in height together with the scissor-bar assemblies 22. The tailgate 24 is pivotally connected to the remainder of the wagon 10 at its base such that the tailgate can be raised (closed, as shown in FIG. 1) or lowered (opened, as shown in FIG. 2). A pair of braces 26 connect the telescoping pole assemblies 20 of the tailgate 24 to the rear telescoping pole assemblies of the side walls. The braces 26 are preferably pivotally pinned to telescoping pole assemblies 20 of the side walls and comprise elongate slots 28 in which pins 30 on the tailgate 24 slide, thus the braces 26 only provide support for the tailgate when that tailgate 24 is fully opened (as shown in FIG. 5).

The frame 12 of the wagon 10 also preferably comprises a collapsible bottom support assembly 32. The bottom support assembly preferably comprises four bars 34 that are each pivotally connected to a central hub 36 and extend therefrom. Each of the four bars 34 is also pivotally connected to the bottom end portion of a respective one of the telescoping pole assemblies 20. As the wagon 10 is collapsed, the central hub 36 moves upward. The central hub 36 is preferably configured to limit the extent to which the bars 34 can pivot relative to the central hub, such that the central hub cannot be moved lower than being in plane with the bars of the bottom support assembly 32. Thus, when the wagon 10 is in its expanded configuration, the bottom support assembly 32 is capable of supporting a downward acting load. Thus the liner 18 needs not carry the entire load of cargo placed in the wagon 10.

Each of the wheels 14 of the wagon 10 is attached to the lower portion of a respective one of the telescoping pole assemblies 20. Preferably, the two wheels 14 nearest the tow handle 16 are able to pivot about vertical axes (in addition to being able to rotate on their horizontal axles). The other two wheels 14 preferably are not.

The tow handle 16 preferably comprises two telescopically attached sections. The telescoping tow handle 16 is preferably connected to the lower portion of the nearest two of the telescoping pole assemblies 20 via two connecting members 38. Each of the connecting members 38 has a first end portion that is pivotally connected to the bottom end portion of the respective telescoping pole assembly 20, and an opposite second end portion that is pivotally connected to the telescoping tow handle 16. Each connecting member 38 extends upward in a sloped manner from the bottom portion of the respective telescoping pole assembly 20 to the telescoping tow handle 16 such that the second end portions of the connecting members move upward relative to the bottom end portions of the telescoping pole assemblies as the wagon 10 is collapsed. When the wagon 10 is collapsed, the telescoping tow handle 16 can also be collapsed such that it does not extend above the frame 12 of the wagon.

The pliable liner 18 of the wagon 10 rests inside the frame 12 when the wagon is expanded and forms the open-top interior compartment 32 of the wagon. Each upper corner of the pliable liner is attached to the top portion of a respective one of the telescoping pole assemblies 20. The pliable liner 18 also preferably comprises a looped fastener (such as Velcro®) strap 40 that secures the base of the pliable liner 18 to the bars 34 and the central hub 36 of the frame 12. The pliable liner 18 preferably further includes a pair of inverted pockets 42. The inverted pockets 42 are configured to receive the top-center portion of each of the side scissor-bar assemblies 22 for supporting the pliable liner 18 therefrom (as shown in FIG. 1). The pliable liner 18 also includes a portion attached to the tailgate 24 as shown.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such and order is inherent.

What is claimed is:

1. A wagon that is adjustable between an expanded configuration and a collapsed configuration, the wagon comprising:
   a frame, the frame having a front wall, two side walls, and a rear tailgate, each of the front wall, side walls, and the tailgate being formed by a respective scissor-bar assembly, the frame also having a vertically oriented telescoping pole assembly at each intersection where the scissor-bar assembly of the front wall meets each of the side walls, the frame further having a vertical telescoping pole assembly connected to each rear end of the scissor-bar assemblies of the side walls and a telescoping poll assembly at each side end of the scissor-bar assembly of the tailgate, the tailgate and the telescoping polls attached thereto being pivotal from a substantially vertical orientation to a substantially horizontal orientation when the wagon is in the expanded configuration, the frame being such that as the wagon is altered from the wagon's expanded configuration to the wagon's collapsed configuration with the tailgate in its vertical orientation the scissor-bar assemblies and the telescoping pole assemblies increase in height and the scissor-bar assemblies decrease in width;

four wheels, each being attached to a bottom end portion of a respective one of the telescoping pole assemblies; and a pliable liner that is connected to the frame and that defines an open-top interior compartment of the wagon when the wagon is in the wagon's expanded configuration.

2. The wagon in accordance with claim 1 comprising a telescoping tow handle, the telescoping tow handle being adjustable between collapsed and expanded configurations.

3. The wagon in accordance with claim 1 wherein each of two of the scissor-bar assemblies comprises a single pair of crossed bars and each of the other two of the scissor-bar assemblies comprises a plurality of pairs of crossed bars connected to each other.

4. The wagon in accordance with claim 1 wherein the wagon further comprises a collapsible bottom support assembly, the bottom support assembly comprises a central hub and four bars, the four bars are each pivotally connected to the central hub and to the bottom end portion of a respective one of the telescoping pole assemblies.

5. The wagon in accordance with claim 4 wherein the central hub allows each of the four bars of the bottom support assembly to pivot downward therefrom and prevents the four bars from pivoting upward therefrom beyond horizontal.

6. The wagon in accordance with claim 1 wherein the wagon is configured such that two of the wheels can only revolve about a fixed horizontal axis and the other wheels revolve about vertical axes and are able to rotate about a horizontal axis.

7. The wagon in accordance with claim 1 wherein the telescoping pole assembly connected to the rear end of the scissor-bar assembly of each of the side walls is connected by a fitting to a respective one of the telescoping pole assemblies of the tailgate.

8. The wagon in accordance with claim 7 wherein a brace member connects the telescoping pole assembly connected to the rear end of the scissor-bar assembly of each of the side walls to the respective one of the telescoping pole assemblies of the tailgate, and the brace members prevent the tailgate from pivoting downward beyond a limit.

9. The wagon in accordance with claim 1 wherein the wagon comprises selectively releasable straps that are configured to secure the tailgate in the substantially vertical orientation.

\* \* \* \* \*